United States Patent
Okino et al.

(10) Patent No.: US 11,951,817 B2
(45) Date of Patent: Apr. 9, 2024

(54) DOOR HOLE SEAL AND METHOD OF STACKING A PLURALITY OF DOOR HOLE SEALS

(71) Applicant: NISHIKAWA RUBBER CO., LTD., Hiroshima (JP)

(72) Inventors: Fumito Okino, Hiroshima (JP); Taisuke Kameoka, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 923 days.

(21) Appl. No.: 16/945,080

(22) Filed: Jul. 31, 2020

(65) Prior Publication Data

US 2021/0053429 A1  Feb. 25, 2021

(30) Foreign Application Priority Data

Aug. 20, 2019  (JP) ................ 2019-150501

(51) Int. Cl.
*B60J 5/04* (2006.01)

(52) U.S. Cl.
CPC .................. *B60J 5/0418* (2013.01)

(58) Field of Classification Search
CPC ............ B60J 5/0418; B60R 13/0892
See application file for complete search history.

(56) References Cited

U.S. PATENT DOCUMENTS

| | | | | |
|---|---|---|---|---|
| 4,604,302 A | * | 8/1986 | Isaksen | B60R 13/0892 428/80 |
| 4,873,132 A | * | 10/1989 | Jones | B60R 13/02 428/80 |
| 4,972,765 A | * | 11/1990 | Dixon | B60R 13/0892 137/855 |
| 5,322,722 A | * | 6/1994 | Rozenberg | B60J 5/042 296/191 |
| 6,541,098 B2 | * | 4/2003 | Venkatasanthanam | B32B 3/28 428/161 |
| 6,676,195 B1 | * | 1/2004 | Marriott | B60J 5/0418 296/146.7 |
| 8,507,075 B2 | * | 8/2013 | Filipczak | B60J 5/0418 296/146.7 |
| 9,517,736 B2 | * | 12/2016 | Bianchi | B62D 65/06 |

(Continued)

FOREIGN PATENT DOCUMENTS

| | | | | |
|---|---|---|---|---|
| EP | 0737602 A1 | * | 10/1996 | |
| EP | 1426239 A1 | * | 6/2004 | ............ B60J 5/0418 |

(Continued)

OTHER PUBLICATIONS

Office Action For JP Patent Application No. 2019-150501, dated Mar. 14, 2023, 4 pages.

*Primary Examiner* — Catherine A Kelly
(74) *Attorney, Agent, or Firm* — Casimir Jones, S.C.; Robert A. Goetz

(57) ABSTRACT

In a state in which a plurality of door hole seals are stacked on top of each other, the door hole seals are prevented from being bonded to each other without the need to use a release paper. Each of the door hole seals has a main body part and an adhesive part, wherein the main body part has a protrusion provided thereon at a position that is different from a position at which the adhesive part is arranged, and the protrusion has a height greater than a thickness of the adhesive part.

1 Claim, 6 Drawing Sheets

(56) References Cited

U.S. PATENT DOCUMENTS

| | | | | |
|---|---|---|---|---|
| 10,479,176 B2* | 11/2019 | Yamashita | ................ | B32B 7/12 |
| 2014/0065371 A1* | 3/2014 | Kopf | ...................... | B60J 5/0418 |
| | | | | 428/157 |

FOREIGN PATENT DOCUMENTS

| | | | | | |
|---|---|---|---|---|---|
| EP | 2325033 | A1 | * | 5/2011 | ............ B60J 5/0418 |
| FR | 2901188 | A1 | * | 11/2007 | ............ B60J 5/0418 |
| JP | 50-126632 | | | 10/1975 | |
| JP | 2002-052929 | | | 2/2002 | |
| JP | 2004-224168 | | | 8/2004 | |
| JP | 2007-197069 | | | 8/2007 | |
| JP | 2018002094 | A | * | 1/2008 | |
| JP | 2014-136503 | | | 7/2014 | |
| JP | 2018-002094 | | | 1/2018 | |
| WO | 2007/097278 | | | 8/2007 | |

* cited by examiner

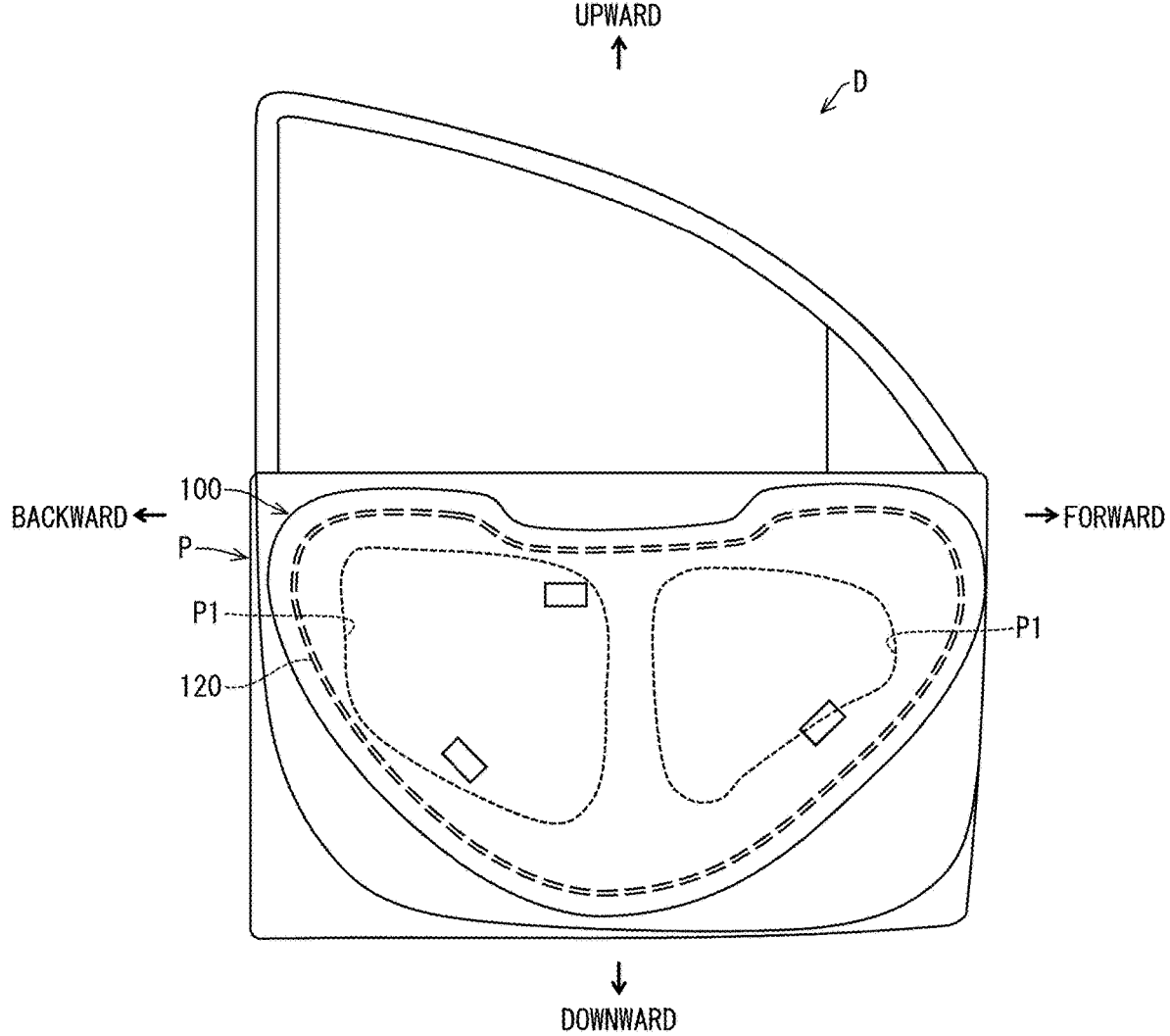

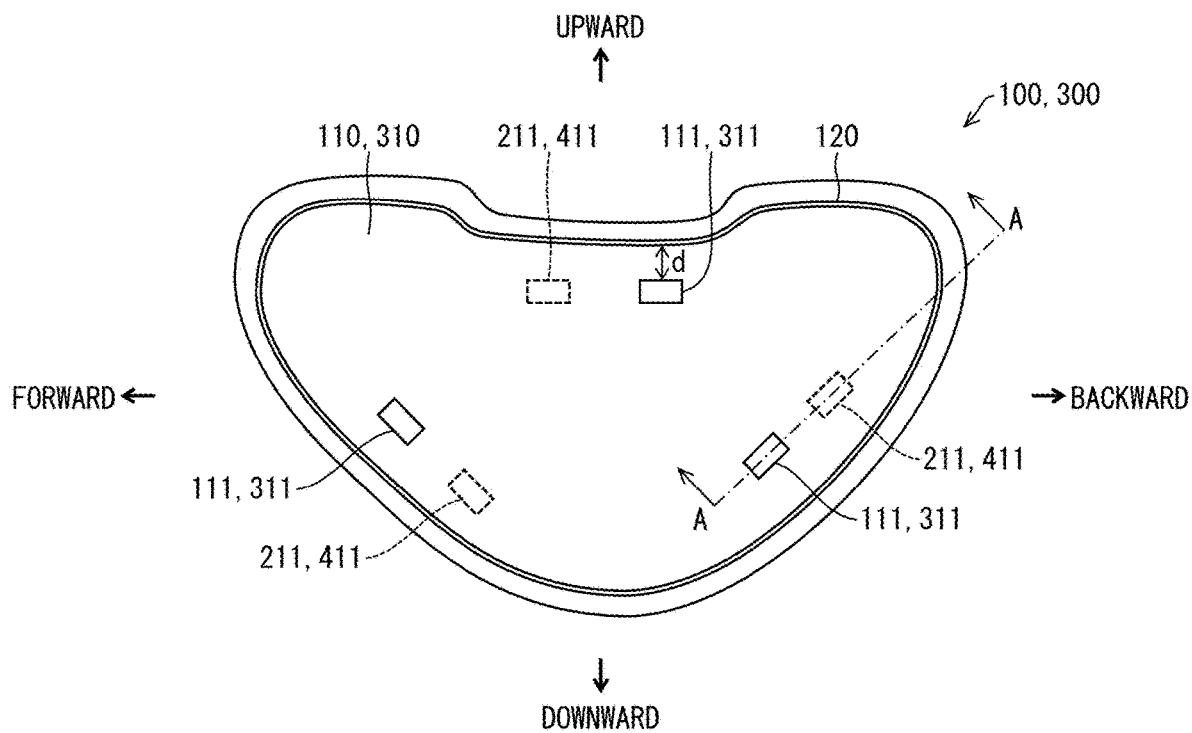
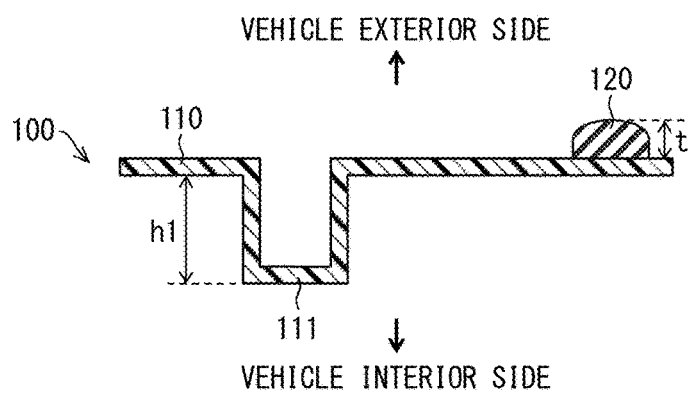

DOOR HOLE SEAL AND METHOD OF STACKING A PLURALITY OF DOOR HOLE SEALS

This Nonprovisional application claims priority under 35 U.S.C. § 119 on Patent Application No. 2019-150501 filed in Japan on Aug. 20, 2019, the entire contents of which are hereby incorporated by reference.

TECHNICAL FIELD

The present invention relates to a door hole seal and a method of stacking a plurality of door hole seals on top of each other.

BACKGROUND ART

Door hole seals are used to close service holes formed in door inner panels of vehicle doors. For example, Patent Literature 1 discloses vehicle door waterproof sheets in which a groove deformable by pressing is filled with a sealant. Such vehicle door waterproof sheets are generally stored or conveyed in a stacked state. In such a case, a release paper can be attached onto the sealant so that the vehicle door waterproof sheets are not bonded to each other with the sealant.

CITATION LIST

Patent Literature

[Patent Literature 1]
Japanese Patent Application Publication Tokukai No. 2004-224168

SUMMARY OF INVENTION

Technical Problem

Unfortunately, since the release paper itself is costly, the use of the release paper increases the manufacturing unit price of a door hole seal such as a vehicle door waterproof sheet. Further, since the release paper is discarded as dust in a vehicle manufacturing line, the use of the release paper places large loads on the environment.

It is an object of an aspect of the present invention to prevent a plurality of door hole seals in a state of being stacked on top of each other from being bonded to each other, without the need to use a release paper.

Solution to Problem

In order to solve the above-described problems, a door hole seal in accordance with an aspect of the present invention is a door hole seal which is to be attached to a door inner panel of a vehicle door, the door hole seal including: a main body part for closing a service hole of the door inner panel; and an adhesive part, arranged on a periphery of the main body part, for bonding the main body part to the door inner panel, the main body part having a protrusion provided thereon at a position that is different from a position at which the adhesive part is arranged, the protrusion having a height greater than a thickness of the adhesive part.

Advantageous Effects of Invention

According to an aspect of the present invention, it is possible to prevent door hole seals in a state of being stacked on top of each other from being bonded to each other, without the need to use a release paper.

BRIEF DESCRIPTION OF DRAWINGS

FIG. 1 is a view illustrating a structure of a vehicle interior side portion of a front door having a first door hole seal in accordance with Embodiment 1 of the present invention attached thereto.

FIG. 2 is a top view illustrating a first door hole seal in accordance with Embodiment 1 or 2 of the present invention.

FIG. 3 is a cross-sectional view of the first door hole seal in accordance with Embodiment 1 of the present invention, the view being taken along a line A-A in FIG. 2.

DESCRIPTION OF EMBODIMENTS

Embodiment 1

Figure 4:
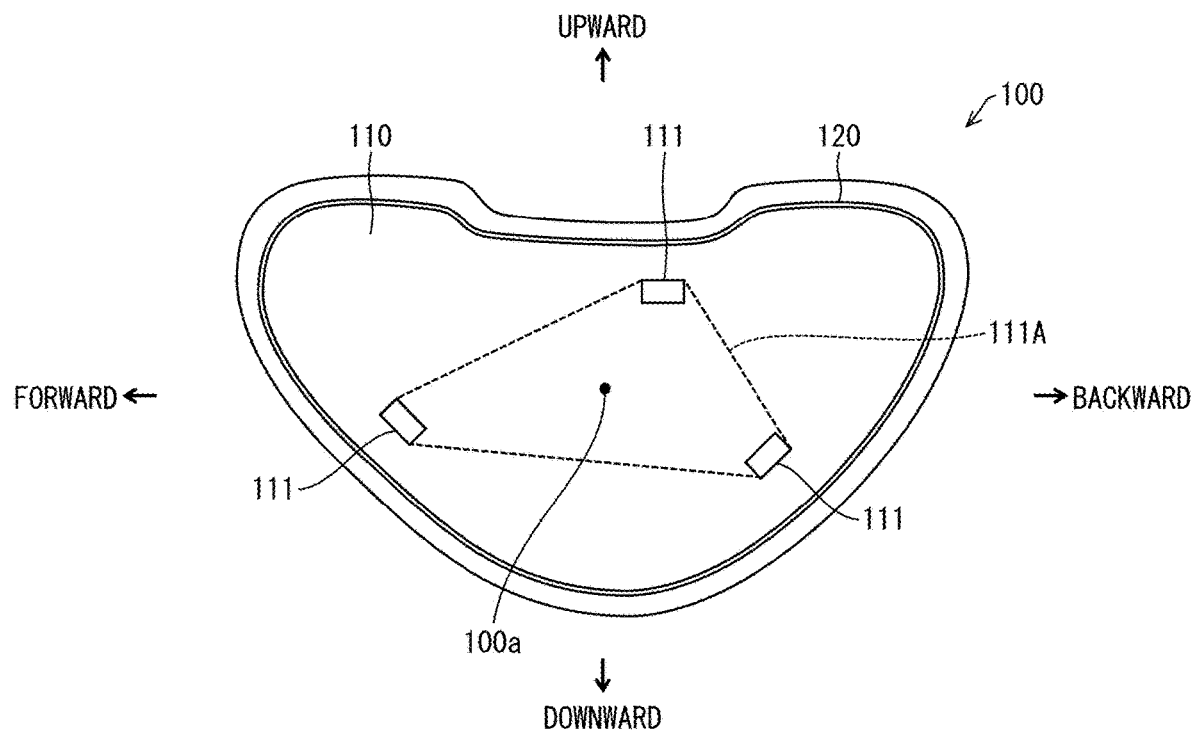
FIG. 4 is a top view illustrating a plane surrounded by first protrusions of the first door hole seal in accordance with Embodiment 1 of the present invention.

The following description will discuss an embodiment of the present invention in detail.

Example of Attachment of Door Hole Seal

First, the structure of a vehicle interior side portion of a front door (vehicle door) D having a first door hole seal 100 in accordance with an embodiment of the present invention attached thereto will be described with reference to FIG. 1. In an example illustrated in FIG. 1, a right-hand side and a left-hand side of a drawing sheet of FIG. 1 correspond to a forward side (front side) and a backward side (rear side), respectively.

As illustrated in FIG. 1, a front door D is openably and closably provided in a front door opening (not illustrated) of a vehicle and includes a door outer panel (not illustrated) and a door inner panel P. The door inner panel P has a service hole P1 into which a repair worker can insert a hand, a tool, and others, for example, for repair of parts inside the front door.

The door inner panel P has the first door hole seal 100 attached thereto with an adhesive part 120 such as a butyl sealer. The first door hole seal 100 closes the service hole P1 and the like, which are provided in the door inner panel P, from the vehicle interior side, thereby preventing rainwater or the like having entered in between a door glass (not illustrated) and a door outer panel from eventually entering the interior of the vehicle through the service hole P1.

Note that the above-described attachment of the first door hole seal 100 is only an example. Alternatively, the first door hole seal 100 may be attached to, for example, a rear door (not illustrated). Thus, the door hole seal in accordance with an embodiment of the present invention can be attached to any type of vehicle doors. Further, the door hole seal in accordance with an embodiment of the present invention can be attached to any type of automobiles such as a hardtop and a convertible. Further, second door hole seals 200 and 400 or a first door hole seal 300 (describe later) can be attached to the door inner panel P in the same manner.

<Structure of First Door Hole Seal 100>

Next, the following description will discuss a structure of the first door hole seal 100 with reference to FIGS. 2 and 3. The first door hole seal 100 includes a main body part 110 and an adhesive part 120. In an example illustrated in FIG. 2, a left-hand side and a right-hand side of a drawing sheet of FIG. 2 correspond to a forward side (front side) and a backward side (rear side), respectively. Note that dotted lines illustrated in FIG. 2 indicate positions of second protrusions 211 of the second door hole seal 200. Such indication is given for the sake of ready comparison between the positions of the first protrusions 111 and the positions of the second protrusions 211, and is not intended to mean that the first door hole seal 100 includes the second protrusions 211.

As illustrated in FIG. 2, the main body part 110 is a member for closing the service hole P1 of the door inner panel P. Examples of a material of the main body part 110 include, but are not limited to, resins and metals. Examples of the resins include thermoplastic resins, and examples of the thermoplastic resins include polyethylene (PE), polypropylene (PP), polyvinyl alcohol (PVA), and ABS resin. These resins may be foam resins or composite resins composited with other materials. Examples of the other materials with which the composite resins are composited include elastomers. Examples of the elastomers include ethylene-propylene-diene rubber (EPDM). Further, examples of the metals include aluminum.

In a case where the main body part 110 is composed of a thermoplastic resin, the first door hole seal 100 can be easily manufactured by vacuum molding (described later). Further, a thickness of the main body part 110 is not limited, but is, for example, approximately 0.05 mm to 2 mm. In a case where the thickness of the main body part 110 is 2 mm or less, the first door hole seal 100 can be easily manufactured by vacuum molding (described later).

The main body part 110 has three first protrusions 111 provided thereon at first positions. In the first door hole seal 100, the first positions are positions that lie in a total of three locations, i.e. a position close to an upward side and a backward side, a position close to a forward side and being about a midpoint position in the up-and-down direction, and a position close to a downward side and a backward side. The first protrusions 111 provided at the three first positions in a one-to-one correspondence protrude toward a vehicle interior side, and each of the first protrusions 111 has an end portion with a flat surface, as illustrated in FIG. 3.

The adhesive part 120 is a member for bonding the main body part 110 to the door inner panel P. Examples of the adhesive part 120 include, but are not limited to, a butyl sealer containing butyl rubber as a main component. Alternatively, the adhesive part 120 may be prepared, by a hot melt method, from, for example, polyethylene vinyl acetate (EVA), olefin, rubber, polyamide, polyester, or a polyurethane-based reactive adhesive (PUR). A thickness of the adhesive part 120 is, for example, approximately 5 mm or less. As illustrated in FIG. 2, the adhesive part 120 is arranged on a periphery of the main body part 110.

As illustrated in FIG. 3, the adhesive part 120 is arranged on a vehicle exterior-side surface of the main body part 110. In other words, the first protrusions 111 are provided on one surface of the main body part 110, and the adhesive part 120 is arranged on the other surface of the main body part 110. Thus, when the first door hole seal 100 is attached to the door inner panel P, the first protrusions 111 are less likely to come into contact with the door inner panel P. Therefore, the door hole seal can be easily attached.

A height h1 of the first protrusions 111 is greater than a thickness, t, of the adhesive part 120. All of the three first protrusions 111 illustrated in FIG. 2 may be identical in height h1 with respect to the main body part 110. Further, a shortest distance, d, between the first protrusions 111 and the adhesive part 120 may be smaller than the height h1 of the first protrusions 111. In other words, at least a part of the first protrusions 111 may be provided within a distance, from the adhesive part 120, smaller than the height h1 of the first protrusions 111.

As illustrated in FIG. 4, a barycenter 100a of the first door hole seal 100 is substantially in the center of a plane 111A which is surrounded by the first protrusions 111 when viewed from above the first door hole seal 100. In other words, the barycenter 100a of the first door hole seal 100 lies inside of an imaginary prism which is formed as the plane 111A surrounded by the first protrusions 111 is subjected to parallel translation in a direction perpendicular to the plane 111A. It is preferable that the barycenter 100a of the first door hole seal 100 coincides with the center of the plane 111A which is surrounded by the first protrusions 111, when viewed from above the first door hole seal 100. This is because such a configuration allows the first protrusions 111 to serve as more stable supports, as described later.

<Structure of Second Door Hole Seal 200>

Figure 5:
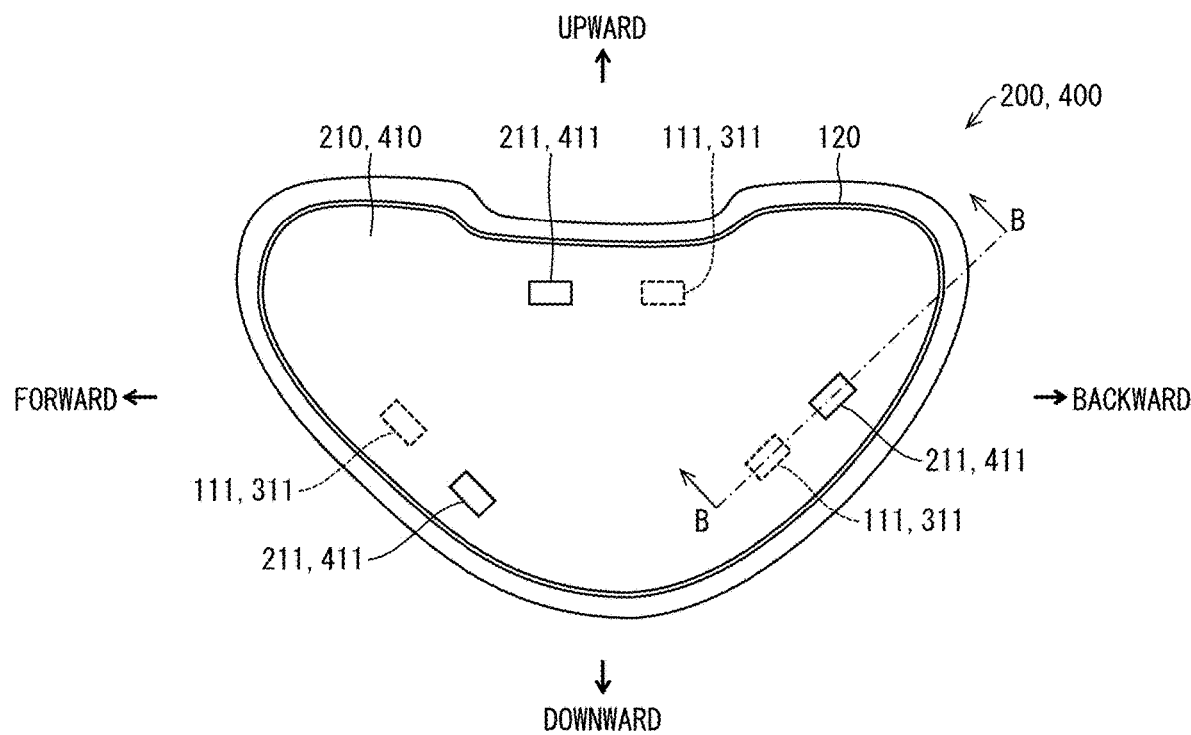
FIG. 5 is a top view illustrating a second door hole seal in accordance with Embodiment 1 or 2 of the present invention.
Figure 6:
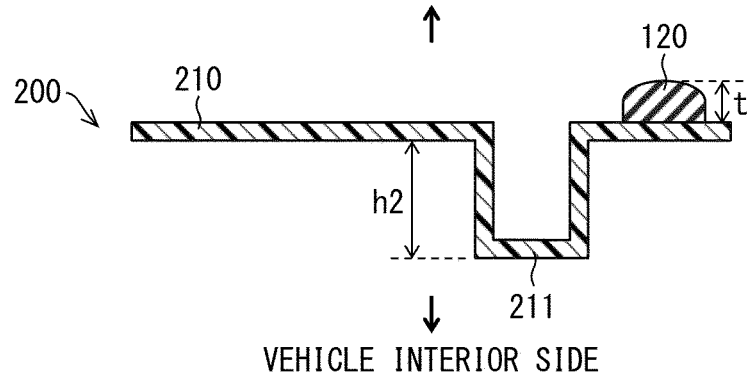
FIG. 6 is a cross-sectional view of the second door hole seal in accordance with Embodiment 1 of the present invention, the view being taken along a line B-B in FIG. 5.

The following description will discuss the structure of the second door hole seal 200 with reference to FIGS. 5 and 6. Note that, for convenience of description, members having functions identical to those of the foregoing embodiments are assigned identical referential numerals and their descriptions are omitted. Note that dotted lines illustrated in FIG. 5 indicate positions of the first protrusions 111 of the first door hole seal 100. Such indication is given for the sake of ready comparison between the positions of the first protrusions 111 and the positions of the second protrusions 211, and is not intended to mean that the second door hole seal 200 includes the first protrusions 111.

As illustrated in FIG. 5, a main body part 210 of the second door hole seal 200 has three second protrusions 211 provided thereon at second positions which are different from the first positions. In other words, the second protrusions 211 of the second door hole seal 200 are arranged at positions which are different from the positions of the first protrusions 111 of the first door hole seal 100. In the second door hole seal 200, the second positions are positions that lie in a total of three locations, i.e. a position close to an upward side and a forward side, a position close to a downward side and a forward side, and a position close to a backward side and being about a midpoint position in the up-and-down direction.

The second protrusions 211 provided at the three second positions in a one-to-one correspondence protrude toward a vehicle interior side, and each of the second protrusions 211 has an end portion with a flat surface, as illustrated in FIG. 6. Further, the second protrusions 211 are provided on one surface of the main body part 210, and the adhesive part 120 is arranged on the other surface of the main body part 210.

A height h2 of the second protrusions 211 is greater than a thickness, t, of the adhesive part 120. All of the three second protrusions 211 may be identical in height h2 with respect to the main body part 210. Further, at least a part of the second protrusions 211 may be provided within a distance, from the adhesive part 120, smaller than the height h2 of the second protrusions 211.

A barycenter of the second door hole seal 200 is substantially in the center of a plane which is surrounded by the second protrusions 211 when viewed from above the second door hole seal 200 illustrated in FIG. 5. In other words, the barycenter of the second door hole seal 200 lies inside of an imaginary prism which is formed as the plane surrounded by the second protrusions 211 is subjected to parallel translation in a direction perpendicular to the plane. It is preferable that the barycenter of the second door hole seal 200 coincides with the center of the plane surrounded by the second protrusions 211, when viewed from above the second door hole seal 200. This is because such a configuration allows the second protrusions 211 to serve as more stable supports, as described later.

<State in which First Door Hole Seal 100 and Second Door Hole Seal 200 are Stacked on Top of Each Other>

Figure 7:
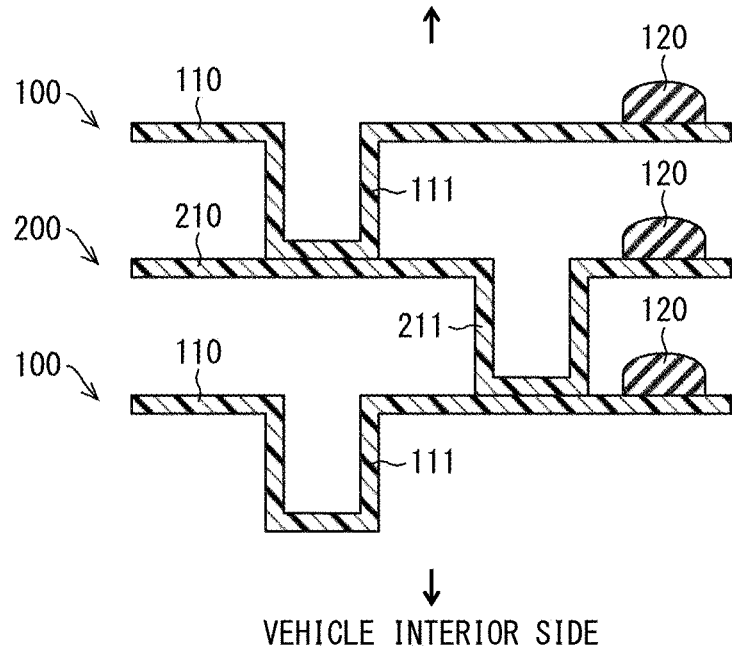
FIG. 7 is a cross-sectional view of the first and second door hole seals in accordance with Embodiment 1 of the present invention in a state of being stacked on top of each other, the view being taken along the line A-A in FIG. 2 and the line B-B in FIG. 5.

The following description will discuss a state in which the first door hole seal 100, the second door hole seal 200, and the first door hole seal 100 are stacked in order on top of each other for storage or conveyance, with reference to FIG. 7. The first door hole seal 100 in an upper position and the second door hole seal 200 are adjacent to each other in a direction in which they are stacked on top of each other. In this way, it is preferable that the first door hole seal 100 and the second door hole seal 200 are stacked on top of each other in an alternating manner. However, a stacking order of the door hole seals is not limited to this order. The stacking order of the door hole seals may be any order, provided that the protrusions of the adjacent door hole seals are arranged at mutually different positions when the stacking order of the door hole seals are stacked on top of each other.

The first protrusions 111 of the first door hole seal 100 (one door hole seal) in the upper position are arranged at positions that are different from the positions of the second protrusions 211 of the second door hole seal 200 (another door hole seal). Thus, the first protrusions 111 abut against the main body part 210 of the second door hole seal 200 at the positions that are different from the positions at which the second protrusions 211 are provided. Further, the first protrusions 111 abut against the main body part 210 of the second door hole seal 200 at the positions that are different from the position at which the adhesive part 120 is arranged.

Moreover, the first protrusions 111 of the first door hole seal 100 in the upper position serve as supports to prevent the first door hole seal 100 in the upper position and the second door hole seal 200 from being brought closer to each other. This makes it possible to prevent the adhesive part 120 of the second door hole seal 200 from coming into contact with the adjacent first door hole seal 100 in the upper position. Thus, it is possible to prevent the first door hole seal 100 in the upper position and the second door hole seal 200 from being bonded to each other, without the need to use a release paper.

Further, as illustrated in FIG. 2, the main body part 110 of the first door hole seal 100 has the three first protrusions 111 provided thereon. It is preferable that these three first protrusions 111 abut against the main body part 210 of the second door hole seal 200 (not illustrated). According to such a configuration, three or more first protrusions 111 of the first door hole seal 100 in the upper position in FIG. 7 serve as supports to prevent the first door hole seal 100 in the upper position and the second door hole seal 200 from being brought closer to each other. This makes it possible to more effectively prevent the adhesive part 120 of the second door hole seal 200 from coming into contact with the adjacent first door hole seal 100 in the upper position, throughout the whole of the first door hole seal 100 and the second door hole seal 200. Thus, it is possible to more effectively prevent the first door hole seal 100 in the upper position and the second door hole seal 200 from being bonded to each other, without the need to use a release paper.

Further, as illustrated in FIG. 4, the barycenter of the first door hole seal 100 lies inside of an imaginary prism which is formed as the plane 111A surrounded by the first protrusions 111 is subjected to parallel translation in a direction perpendicular to the plane 111A. Thus, three or more first protrusions 111 of the first door hole seal 100 serve as more stable supports to prevent the first door hole seal 100 and the second door hole seal 200 from being brought closer to each other. This makes it possible to prevent the adhesive part 120 of the second door hole seal 200 from coming into contact with the adjacent first door hole seal 100, throughout the whole of the second door hole seal 200. Thus, it is possible to even more effectively prevent the first door hole seal 100 in the upper position and the second door hole seal 200 from being bonded to each other, without the need to use a release paper.

Further, all of the three or more first protrusions 111 may be identical in height. With such a configuration, the first door hole seal 100 is less likely to tilt toward the second door hole seal 200 in a state in which the first door hole seal 100 and the second door hole seal 200 are stacked on top of each other. This makes it possible to prevent the adhesive part 120 of the second door hole seal 200 from coming into contact with the adjacent first door hole seal 100, throughout the whole of the first door hole seal 100 and the second door hole seal 200. Thus, it is possible to still more effectively prevent the first door hole seal 100 and the second door hole seal 200 from being bonded to each other, without the need to use a release paper.

Further, each of the first protrusions 111 has an end portion with a flat surface. Thus, each of the first protrusions 111 of the first door hole seal 100 abuts against the main body part 210 of the second door hole seal 200 in a form of a plane, not in a form of a point. This avoids the first protrusions 111 of the first door hole seal 100 in a state in which the first door hole seal 100 and the second door hole seal 200 are stacked on top of each other from locally applying loads to the main body part 210 of the second door hole seal 200. Thus, the second door hole seal 200 is less likely to be deformed or broken. Therefore, it is possible to stack the first door hole seal 100 and the second door hole seal 200 on top each other in a stable state.

Further, at least a part of the first protrusions 111 may be provided within a distance, from the adhesive part 120, smaller than the height h1 of the first protrusions 111. This makes it possible to prevent the adhesive part 120 of the second door hole seal 200 from coming into contact with the adjacent first door hole seal 100 even in a case where the main body part 110 of the first door hole seal 100 has low rigidity and tends to bend by gravitation or the like. Thus, it is possible to further more effectively prevent the first door hole seal 100 and the second door hole seal 200 from being bonded to each other, without the need to use a release paper.

The same applies to the second door hole seal 200 (one door hole seal) and the first door hole seal 100 (another door hole seal) in the lower position which are adjacent to each other in the direction in which they are stacked on top of each other. Specifically, the second protrusions 211 of the second door hole seal 200 serve as supports to prevent the second door hole seal 200 and the first door hole seal 300 in the lower position from being brought closer to each other. This makes it possible to prevent the adhesive part 120 of the first door hole seal 100 in the lower position from coming into contact with the adjacent second door hole seal 200. Thus, it is possible to prevent the second door hole seal 200 and the first door hole seal 100 in the lower position from being bonded to each other, without the need to use a release paper.

<Method of Manufacturing First Door Hole Seal 100 and Second Door Hole Seal 200>

Figure 8:
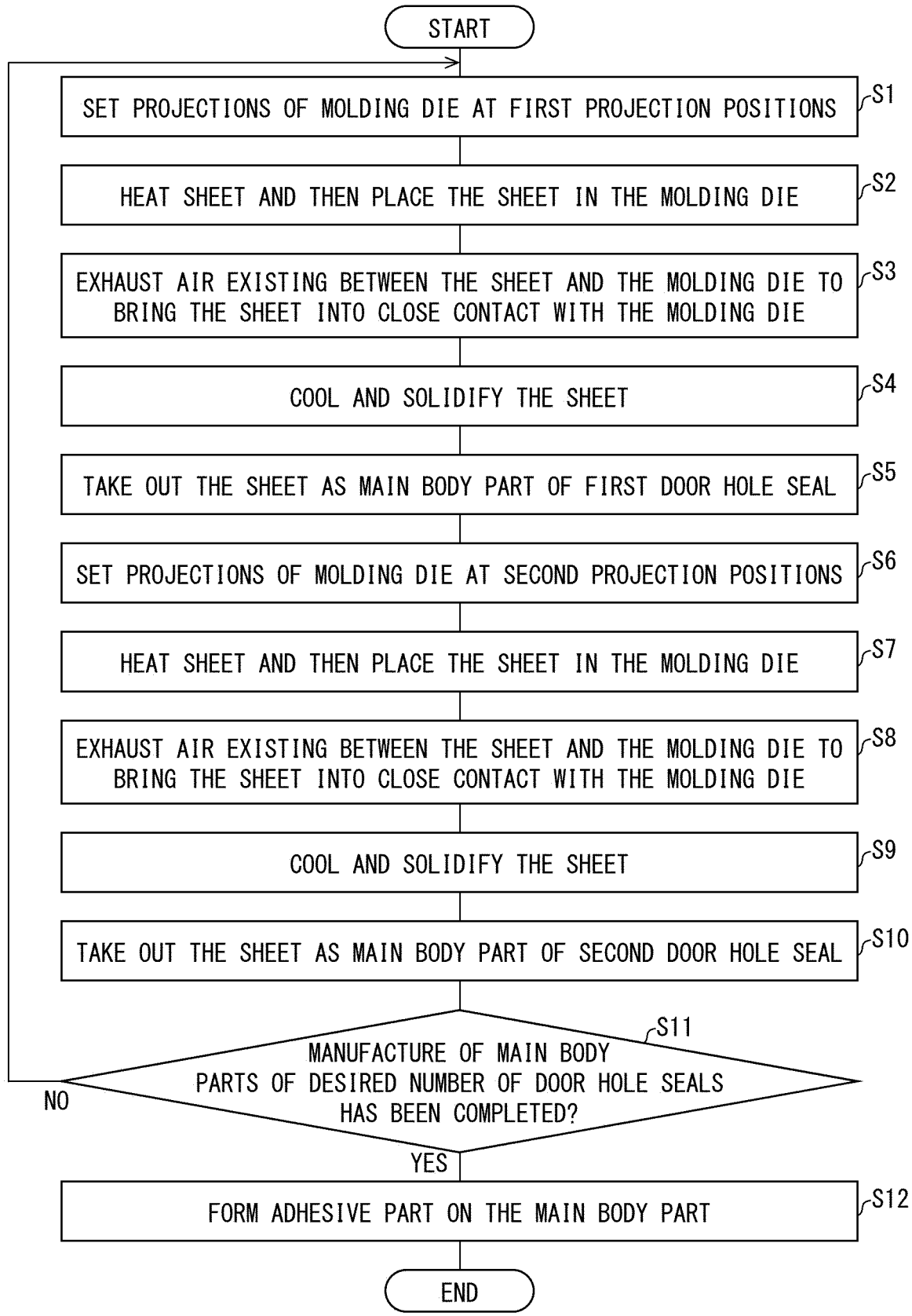
FIG. 8 is a flowchart showing a method of producing the first and second door hole seals in accordance with Embodiment 1 of the present invention.

As illustrated in FIG. 8, the first door hole seal 100 and the second door hole seal 200 can be alternately manufactured by a simple method by, for example, vacuum molding. Specifically, first, in a molding die (not illustrated) for vacuum molding, projections corresponding to the shapes of the first protrusions 111 and second protrusions 211 are set at first projection positions (S1). This first projection positions correspond to the first positions in the first door hole seal 100.

Subsequently, a sheet before subjected to vacuum molding is heated and then placed in a molding die in a state in which the sheet is softened (S2). Then, an air existing between the sheet and the molding die is exhausted to bring the sheet into close contact with the molding die (S3). The exhaustion can be performed through an exhaust port (not illustrated) provided in the molding die. After the step S3, the sheet is cooled and solidified (S4). Then, the sheet is taken out from the molding die to be obtained as the main body part 110 of the first door hole seal 100 (S5).

After the step S5, the positions of the projections of the molding die are set to second projection positions (S6). The second projection positions correspond to the second positions in the second door hole seal 200. The setting of the positions of the projections may be automatically made by a machine.

Then, the main body part 210 of the second door hole seal 200 is manufactured in the same manner as in the steps S2 to S5. Specifically, first, a sheet before subjected to vacuum molding is placed in a molding die in a state in which the sheet is heated and softened (S7). Subsequently, an air existing between the sheet and the molding die is exhausted to bring the sheet into close contact with the molding die (S8). After the step S8, the sheet is cooled and solidified (S9). Then, the sheet is taken out from the molding die to be obtained as the main body part 210 of the second door hole seal 200 (S10).

Then, it is determined whether or not the manufacture of main body parts of a desired number of door hole seals has been completed (S11). In the case of "No" in the step S11, the process returns to the first projection position setting step S1, and the steps S1 to S10 are repeated. In the case of "Yes" in the step S11, the adhesive part 120 is formed on the periphery of the main body part 110 of the first door hole seal 100 and on the periphery of the main body part 210 of the second door hole seal 200 (S12).

Note that the projections provided on the molding die to form the first protrusions 111 and the second protrusions 211 may be separated from the molding die that serves as a base, so that the positions of the projections on the molding die can be easily changed. The molding die may be made of metal or may be made of resin. Further, the positions of the projections may be changed manually or may be changed automatically by a machine.

To change the positions of the projections automatically by a machine, the positions of the projections on the molding die may be changed for each shot by, for example, controlling an actuator such as a cylinder or a motor. Alternatively, for example, a knock cam used in a knock type ballpoint pen or the like may be used to change the positions of the projections on the molding die each time the molding die moves up and down. In this case, the positions of the projections rotate about a rotation axis of the knock cam.

Further, in the adhesive part forming step S12, a workbench or the like may be used in which recesses are provided at respective positions corresponding to the first protrusions 111 and the second protrusions 211. Fitting the first protrusions 111 or the second protrusions 211 into the recesses of such a workbench allows the main body part 110 and the main body part 210 to be held in place. Such a configuration makes the main body part 110 and the main body part 210 less likely to be slipped even in a case where the adhesive part 120 is formed of a highly viscous material. This makes it possible to easily form the adhesive part 120 on the vehicle exterior-side surface of the main body part 110 or the main body part 210.

As described above, the first door hole seal 100 and the second door hole seal 200 can be easily manufactured by vacuum molding which is capable of easily changing the positions of the projections of the molding die. However, the method of manufacturing the first door hole seal 100 and the second door hole seal 200 is not limited to vacuum molding. Alternatively, the first door hole seal 100 and the second door hole seal 200 may be manufactured by, for example, injection molding.

[Variations]

Although the first door hole seal 100 and the second door hole seal 200 in accordance with Embodiment 1 each have three protrusions provided thereon, the first door hole seal 100 and the second door hole seal 200 may each have any number of protrusions provided thereon. For example, two or less protrusions or four or more protrusions may be provided. For example, in a case where two or less protrusions are provided on each of these door hole seals, the door hole seals can be easily manufactured. Further, in a case where four or more protrusions are provided on each door hole seal, a plurality of door hole seals in a state of being stacked on top of each other are more stably prevented from being brought closer to each other. Therefore, it is possible to more effectively prevent the door hole seals from being bonded to each other without the need to use a release paper.

Further, the protrusions may be ridges extending substantially parallel to the main body part. In a case where the protrusions are ridges, the door hole seals are more stably prevented from being brought closer to each other even though a small number of protrusions are provided on each of the door hole seals. This makes it possible to even more effectively prevent the door hole seals from being bonded to each other without the need to use a release paper. Further, the surface of the end portion of each of the protrusions is not limited to a flat surface, and may alternatively be, for example, a hemispherical surface. In a case where the surface of the end portion of each of the protrusions is a hemispherical surface, it is easy to remove the main body part from the molding die after the main body part of the door hole seal is formed by vacuum molding.

In Embodiment 1, two types of door hole seals, i.e. the first door hole seal 100 and the second door hole seal 200, are alternately stacked on top of each other. However, three or more types of door hole seals may be stacked in order on top of each other, provided that the protrusions of the adjacent door hole seals in the state of being stacked on top of each other are arranged at mutually different positions. Further, in Embodiment 1, in the method of manufacturing the door hole seal, the steps S1 and S6 of setting the projections of the molding die at the first projection positions and at the second projection positions, respectively, are carried out immediately before the steps S2 and S7, respectively, of placing the corresponding sheets in the molding die. However, the order in which these steps are carried out is not limited to this order. For example, the individual steps of setting the projection positions may be carried out after the steps S5 and S10 of taking out the corresponding sheets.

Embodiment 2

The following description will discuss another embodiment of the present invention. Note that, for convenience of description, members having functions identical to those of foregoing embodiments are assigned identical referential numerals and their descriptions are omitted.

A first door hole seal 300 in accordance with Embodiment 2 is different from the first door hole seal 100 in accordance with Embodiment 1 in that first protrusions 311 are provided on the same surface of a main body part 310 with an adhesive part 120. Further, a second door hole seal 400 in accordance with Embodiment 2 is different from the second door hole seal 200 in accordance with Embodiment 1 in that second protrusions 411 are provided on the same surface of a main body part 410 with an adhesive part 120.

<Structure of First Door Hole Seal 300>

Figure 9:
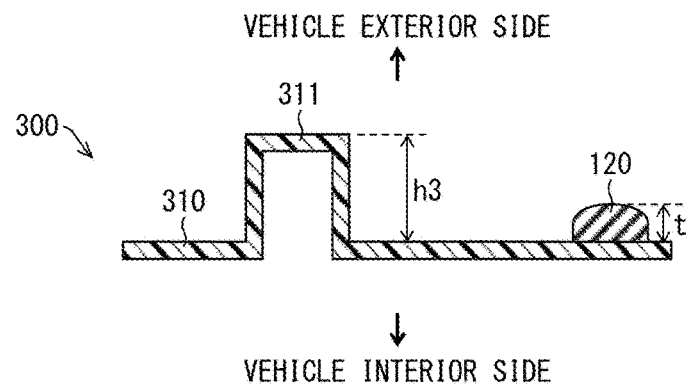
FIG. 9 is a cross-sectional view of the first door hole seal in accordance with Embodiment 2 of the present invention, the view being taken along the line A-A in FIG. 2.

The following description will discuss a structure of the first door hole seal 300 with reference to FIGS. 2 and 9. The first door hole seal 300 includes a main body part 310 and an adhesive part 120. The main body part 310 has three first protrusions 311 provided thereon at first positions. The first protrusions 311 protrude toward a vehicle exterior side, as illustrated in FIG. 9. Since the adhesive part 120 is arranged on the vehicle exterior-side surface of the main body part 310, the first protrusions 311 and the adhesive part 120 are provided on the same surface of the main body part 310.

As illustrated in FIG. 9, a height h3 of the first protrusions 311 is greater than a thickness, t, of the adhesive part 120. Further, all of the three first protrusions 311 illustrated in FIG. 2 may be identical in height h3 with respect to the main body part 310.

<Structure of Second Door Hole Seal 400>

Figure 10:
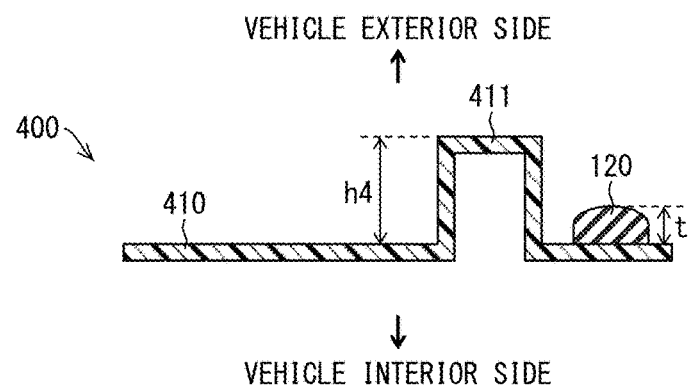
FIG. 10 is a cross-sectional view of the second door hole seal in accordance with Embodiment 2 of the present invention, the view being taken along the line B-B in FIG. 5.

The following description will discuss a structure of the second door hole seal 400 with reference to FIGS. 5 and 10. The second door hole seal 400 includes a main body part 410 and an adhesive part 120. The main body part 410 has three second protrusions 411 provided thereon at second positions. In other words, the second protrusions 411 of the second door hole seal 400 are arranged at positions different from the positions of the first protrusions 311 of the first door hole seal 300. The second protrusions 411 protrude toward a vehicle exterior side, as illustrated in FIG. 10. Since the adhesive part 120 is arranged on the vehicle exterior-side surface of the main body part 410, the second protrusions 411 and the adhesive part 120 are provided on the same surface of the main body part 410.

As illustrated in FIG. 10, a height h4 of the second protrusions 411 is greater than a thickness, t, of the adhesive part 120. Further, all of the three second protrusions 411 illustrated in FIG. 5 may be identical in height h4 with respect to the main body part 410.

<State in which First Door Hole Seal 300 and Second Door Hole Seal 400 are Stacked on Top of Each Other>

Figure 11:
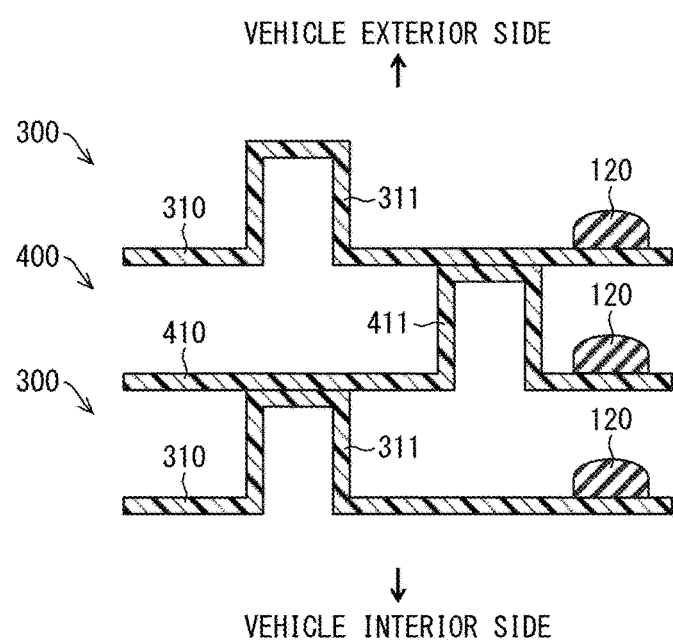
FIG. 11 is a cross-sectional view of the first and second door hole seals in accordance with Embodiment 2 of the present invention in a state of being stacked on top of each other, the view being taken along the line A-A in FIG. 2 and the line B-B in FIG. 5.

The following description will discuss a state in which a first door hole seal 300, a second door hole seal 400, and another first door hole seal 300 are stacked in order on top of each other, with reference to FIG. 11. The first door hole seal 300 in a lower position and the second door hole seal 400 are adjacent to each other in a direction in which they are stacked on top of each other.

The first protrusions 311 of the first door hole seal 300 (one door hole seal) in the lower position are arranged at positions that are different from the positions of the second protrusions 411 of the second door hole seal 400 (another door hole seal). Thus, the first protrusions 311 abut against the main body part 410 of the second door hole seal 400 at the positions that are different from the positions at which the second protrusions 411 are provided. Further, the first protrusions 311 abut against the main body part 410 of the second door hole seal 400 at the positions that are different from the position at which the adhesive part 120 is arranged.

Moreover, the first protrusions 311 of the first door hole seal 300 in the lower position serves as supports to prevent the first door hole seal 300 in the lower position and the second door hole seal 400 from being brought closer to each other. This makes it possible to prevent the adhesive part 120 of the first door hole seal 300 in the lower position from coming into contact with the adjacent second door hole seal 400. Thus, it is possible to prevent the first door hole seal 300 in the lower position and the second door hole seal 400 from being bonded to each other, without the need to use a release paper.

The same applies to the second door hole seal 400 (one door hole seal) and the first door hole seal 300 (another door hole seal) in the upper position which are adjacent to each other in the direction in which they are stacked on top of each other. Specifically, the second protrusions 411 of the second door hole seal 400 serve as supports to prevent the second door hole seal 400 and the first door hole seal 300 in the upper position from being brought closer to each other. This makes it possible to prevent the adhesive part 120 of the second door hole seal 400 from coming into contact with the adjacent first door hole seal 300. Thus, it is possible to prevent the second door hole seal 400 and the first door hole seal 300 in the upper position from being bonded to each other, without the need to use a release paper.

<Method of Manufacturing First Door Hole Seal 300 and Second Door Hole Seal 400>

The first door hole seal 300 and the second door hole seal 400 can be manufactured by a method which is the same as the method illustrated in FIG. 8 except for the adhesive part forming step S12 in the flowchart shown in FIG. 8.

In the adhesive part forming step S12, it is possible to place the main body part 310 and the main body part 410 flat on the workbench with the first protrusions 311 and the second protrusions 411 facing upward, and then form the adhesive part 120 from above. In such a case, in a case where the main body part 310 and the main body part 410 are pressed from above at positions where the adhesive part 120 is to be formed by a device for forming the adhesive part 120, the main body part 310 and the main body part 410 are less likely to tilt. Thus, it is possible to easily form the adhesive part 120. Therefore, it is possible to easily manufacture the first door hole seal 300 and the second door hole seal 400.

Aspects of the present invention can also be expressed as follows:

A door hole seal in accordance with an aspect of the present invention is a door hole seal which is to be attached to a door inner panel of a vehicle door, the door hole seal including: a main body part for closing a service hole of the door inner panel; and an adhesive part, arranged on a periphery of the main body part, for bonding the main body part to the door inner panel, the main body part having a protrusion provided thereon at a position that is different from a position at which the adhesive part is arranged, the protrusion having a height greater than a thickness of the adhesive part.

According to the above-described configuration, the protrusion of the door hole seal is provided on the main body part of the door hole seal at the position that is different from the position where the adhesive part is provided. Thus, in a case where the door hole seals are stacked on top of each other, the protrusion serves as a support to prevent the door hole seals adjacent to each other in a direction in which the door hole seals are stacked on top of each other from being brought closer to each other. Thus, the adhesive part of the door hole seal is prevented from coming into contact with an adjacent door hole seal. This makes it possible to prevent the door hole seals from being bonded to each other without the need to use a release paper.

The door hole seal in accordance with an aspect of the present invention may be configured such that the door hole seal is one of two door hole seals included in a plurality of door hole seals, in a state in which the plurality of door hole seals are stacked on top of each other for storage or for conveyance, the two door hole seals adjacent to each other in a direction in which the plurality of door hole seals are stacked on top of each other are configured such that: the protrusion of one door hole seal of the two door hole seals is arranged at a position that is different from a position of the protrusion of another door hole seal of the two door hole seals, and the protrusion of the one door hole seal abuts against the main body part of the another door hole seal at a position that is different from the position at which the adhesive part is arranged.

According to the above-described configuration, the two door hole seals, in a state in which the plurality of door hole seals are stacked on top of each other, are adjacent to each other and are configured such that: the protrusion of one door hole seal of the two door hole seals abuts against the main body part of another door hole seal of the two door hole seals at a position that is different from the position at which the adhesive part is arranged and from the position at which the protrusion is arranged. Then, the protrusion of the one door hole seal serves as a support to prevent the one door hole seal and the another door hole seal from being brought closer to each other. Thus, the adhesive part of the door hole seal is prevented from coming into contact with the adjacent door hole seal. This makes it possible to prevent the door hole seals from being bonded to each other, without the need to use a release paper.

The door hole seal in accordance with an aspect of the present invention may be configured such that the protrusion provided on the main body part comprise three or more protrusions, the door hole seal is one of two door hole seals included in a plurality of door hole seals, in a state in which the plurality of door hole seals are stacked on top of each other, the two door hole seals adjacent to each other in a direction in which the plurality of door hole seals are stacked on top of each other are configured such that: the three or more protrusions of one door hole seal of the two door hole seals abut against the main body part of another door hole seal of the two door hole seals.

According to the above-described configuration, the three or more protrusions of the one door hole seal of the adjacent door hole seals serve as supports to prevent the one door hole seal and the another door hole seal from being brought closer to each other. Thus, the adhesive part of the door hole seal is prevented from coming into contact with the adjacent door hole seal. This makes it possible to more effectively prevent the door hole seals from being bonded to each other, without the need to use a release paper.

The door hole seal in accordance with an aspect of the present invention may be configured such that a barycenter of the door hole seal lies inside of an imaginary prism which is formed as a plane surrounded by the three or more protrusions is subjected to parallel translation in a direction perpendicular to the plane.

According to the above-described configuration, the three or more protrusions of the one door hole seal of the adjacent door hole seals serve as more stable supports to prevent the one door hole seal and the another door hole seal from being brought closer to each other. Thus, the adhesive part of the door hole seal is prevented from coming into contact with the adjacent door hole seal throughout the door hole seals. This makes it possible to even more effectively prevent the door hole seals from being bonded to each other, without the need to use a release paper.

The door hole seal in accordance with an aspect of the present invention may be configured such that all of the three or more protrusions are identical in the height. According to the above-described configuration, in a state in which the plurality of door hole seals are stacked on top of each other, the one door hole seal of the adjacent door hole seals is less likely to tilt toward the another door hole seal of the adjacent door hole seals. Thus, the adhesive part of the door hole seal is more effectively prevented from coming into contact with the adjacent door hole seal throughout the whole of the door hole seals. This makes it possible to still more effectively prevent the door hole seals from being bonded to each other, without the need to use a release paper.

The door hole seal in accordance with an aspect of the present invention may be configured such that the protrusion has an end portion with a flat surface. According to the above-described configuration, the protrusion of the one door hole seal abuts against the main body part of the another door hole seal in a form of a plane, not in a form of a point. This avoids the one door hole seal of the adjacent door hole seals in a state in which the plurality of door hole seals are stacked on top of each other from locally applying loads to the another door hole seal. Thus, the another door hole seal is less likely to be deformed or broken. Therefore, it is possible to stack the plurality of door hole seals on top each other in a stable state.

The door hole seal in accordance with an aspect of the present invention may be configured such that the protrusion is provided on one surface of the main body part, and the adhesive part is arranged on the other surface of the main body part. According to the above-described configuration, at the time of attaching the door hole seal to the door inner panel, the protrusion is less likely to come into contact with the door inner panel. Therefore, the door hole seal can be easily attached. Further, at the time of forming the adhesive part on the main body part, the protrusion provided on the one surface of the main body part can be fixed by, for example, a recess provided on a workbench. Thus, it is possible to easily form the adhesive part on the other surface of the main body part in a state in which the door hole seal is stable. Therefore, it is possible to easily manufacture the door hole seal.

The door hole seal in accordance with an aspect of the present invention may be configured such that the protrusion and the adhesive part are provided on the same surface of the main body part. According to the above-described configuration, at the time of forming the adhesive part after the main body part of the door hole seal has been manufactured, it is possible to place the main body part flat on the workbench with the protrusion facing upward, and then form the adhesive part from above. In such a case, in a case where the main body part is pressed from above at positions where the adhesive part is to be formed by a device for forming the adhesive part, the main body part is less likely to tilt. Thus, it is possible to easily form the adhesive part. Therefore, it is possible to easily manufacture the door hole seal.

A method of stacking, on top of each other, a plurality of door hole seals in accordance with an aspect of the present invention is a method of stacking, on top of each other, a plurality of door hole seals each of which is to be attached to a door inner panel of a vehicle door, each of the door hole seals including: a main body part for closing a service hole of the door inner panel; and an adhesive part, arranged on a periphery of the main body part, for bonding the main body part to the door inner panel, the main body part having a protrusion provided thereon, the protrusion having a height greater than a thickness of the adhesive part, the plurality of door hole seals including two door hole seals adjacent to each other in a direction in which the plurality of door hole seals are stacked on top of each other, wherein the protrusion of one door hole seal of the two adjacent door hole seals is arranged at a position that is different from a position of the protrusion of another door hole seal of the two adjacent door hole seals, and the protrusion of the one door hole seal is arranged so as to abut against the main body part of the another door hole seal at a position that is different from the position at which the adhesive part is arranged.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 100, 300: First door hole seal (one door hole seal)
100a: Barycenter
110, 210, 310, 410: Main body part
111, 311: First protrusion
111A: Plane
120: Adhesive part
200, 400: Second door hole seal (another door hole seal)
211, 411 Second protrusion
D: Front door (vehicle door)
P: Door inner panel
P1: Service hole
h1, h3: Height of first protrusion
h2, h4: Height of second protrusion
t: Thickness of adhesive part

The invention claimed is:

1. A method of stacking, on top of each other, a plurality of door hole seals each of which is to be attached to a door inner panel of a vehicle door,
  each of the door hole seals comprising:
  a main body part for closing a service hole of the door inner panel; and
  an adhesive part, arranged on a periphery of the main body part, for bonding the main body part to the door inner panel,
  the main body part having a protrusion provided thereon, the protrusion having a height greater than a thickness of the adhesive part,
  the plurality of door hole seals including two door hole seals adjacent to each other in a direction in which the plurality of door hole seals are stacked on top of each other,
  wherein the protrusion of one door hole seal of the two adjacent door hole seals is arranged at a position that is different from a position of the protrusion of another door hole seal of the two adjacent door hole seals, and
  the protrusion of the one door hole seal is arranged so as to abut against the main body part of the another door hole seal at a position that is different from the position at which the adhesive part is arranged,
  the method comprising the step of:
  stacking the another door hole seal on top of the one door hole seal.

* * * * *